United States Patent
Kondo et al.

(10) Patent No.: US 6,885,775 B2
(45) Date of Patent: Apr. 26, 2005

(54) IMAGE PROCESSING METHOD AND IMAGE PROCESSING APPARATUS

(75) Inventors: Satoshi Kondo, Kyoto (JP); Toshiyuki Shimada, Hyogo (JP); Masahiro Honjo, Osaka (JP); Masao Kitagawa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 643 days.

(21) Appl. No.: 09/764,381

(22) Filed: Jan. 19, 2001

(65) Prior Publication Data

US 2001/0022857 A1 Sep. 20, 2001

(30) Foreign Application Priority Data

Jan. 21, 2000 (JP) ........................................ 2000-012544

(51) Int. Cl.[7] ................................................ G06K 9/40
(52) U.S. Cl. ...................... 382/268; 382/275; 348/607; 380/217
(58) Field of Search ................................. 382/103, 106, 382/107, 162, 167, 168, 169, 172, 189, 210, 212, 214, 216, 232, 235, 236, 237, 251, 252, 254, 255, 258, 260, 261, 262, 263, 268, 274, 275, 276, 302, 305; 348/314, 607, 622; 345/611; 375/240.11, 240.2; 358/426.14; 380/212, 217; 386/10, 111, 115

(56) References Cited

U.S. PATENT DOCUMENTS

| | | | | |
|---|---|---|---|---|
| 4,691,247 A | * | 9/1987 | Honjo et al. | 386/10 |
| 4,733,302 A | * | 3/1988 | Kinoshita et al. | 348/314 |
| 4,916,542 A | * | 4/1990 | Yoneda et al. | 348/622 |
| 4,941,055 A | * | 7/1990 | Fujimoto | 386/115 |
| 5,068,909 A | * | 11/1991 | Rutherford et al. | 382/302 |
| 5,850,294 A | * | 12/1998 | Apostolopoulos et al. | 358/426.14 |
| 5,982,434 A | * | 11/1999 | Tong et al. | 375/240.11 |
| 6,115,077 A | * | 9/2000 | Tsukagoshi | 348/607 |
| 6,321,027 B2 | * | 11/2001 | Honjo | 386/111 |
| 6,347,118 B1 | * | 2/2002 | Takayama | 375/240.2 |
| 6,370,262 B1 | * | 4/2002 | Kawabata | 382/106 |

FOREIGN PATENT DOCUMENTS

JP  2643636  8/1997

* cited by examiner

Primary Examiner—Bhavesh M. Mehta
Assistant Examiner—Seyed Azarian
(74) Attorney, Agent, or Firm—Wenderoth, Lind & Ponack, L.L.P.

(57) ABSTRACT

An image processing apparatus comprises a noise detection means for performing noise detection on an input image; a noise removal means for removing noise from a predetermined region of the input image, on the basis of the result of the noise detection; a counting means for obtaining the ratio of an area targeted for noise removal to the predetermined region of the input image; a statistics calculation means for obtaining the statistics on the ratios obtained by the counting means over a predetermined period of time; an image generation means for generating an image indicating the statistics; and an image composition means for superimposing the image generated by the image generation means on the image outputted from the noise removal means to generate a composite image for display. Therefore, the viewer can easily know how much noise is removed from the predetermined region of the input image, for every predetermined period of time.

44 Claims, 17 Drawing Sheets

206

207

208

209

IMAGE PROCESSING METHOD AND IMAGE PROCESSING APPARATUS

FIELD OF THE INVENTION

The present invention relates to an image processing method and an image processing apparatus for detecting noise that occurs in a still image or a moving image, and displaying the noise.

BACKGROUND OF THE INVENTION

In recent years, JPEG, MPEG and the like have been widely used as high-performance image compressive coding methods in the fields of broadcasting, communication, and storage. In the JPEG coding method, an image is coded by removing redundancy in the space direction from the image. In the MPEG coding method, an image is coded by removing redundancies in the space direction and the time direction from the image.

Usually, when the bit rate is high (when the compression ratio is small), degradation in image quality is inconspicuous in the JPEG and MPEG coding methods. However, when the bit rate is low (when the compression ratio is large), degradation in image quality, i.e., coding noise, becomes conspicuous. There are blocking artifact (also referred to as block noise or block distortion) and ringing artifact (also referred to as mosquito noise or corona noise) as typical coding noises in the JPEG and MPEG coding methods.

The blocking artifact is a phenomenon in which the edges of a block sharply look like a tile. This phenomenon is caused by an image signal in a block that has only low frequency components, and the values of the frequency components differ from those of adjacent blocks.

The ringing artifact is a phenomenon in which flicker occurs in the vicinity of the edges of a block as if mosquitoes are flying. This phenomenon is caused by high frequency components possessed by an image signal that are lost in the quantization process.

The blocking artifact and the ringing artifact are very conspicuous as degradation in image quality, in contrast with the conventional analog noise. A method for removing these noises is described in, for example, Japanese Patent No. 2643636. Recently, the method of removing noise in the time direction has been widely used.

However, when an image is subjected to noise removal according to the above-mentioned conventional method, the viewer cannot easily judge how much the image quality is improved as compared with the original image or which part of the image is subjected to noise removal, from the image after noise removal.

SUMMARY OF THE INVENTION

The present invention is made to solve the above-described problems and has for its object to provide an image processing method and an image processing apparatus by which, when an image is subjected to noise detection and removal, information about how much the image quality is improved as compared with the original image or which part of the image is subjected to noise removal is displayed with the image so that the viewer can easily know the information.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an image processing method comprises a noise detection step of performing noise detection on an image; a noise removal step of removing noise from a predetermined region of the image, on the basis of the result of the noise detection; an arithmetic step of obtaining the ratio of an area targeted for noise removal to the predetermined region of the image, on the basis of the result of the noise detection; and an image generation step of generating an image indicating the ratio, on the basis of the ratio obtained in the arithmetic step. Therefore, when noise removal is performed on an image, the viewer can easily know the ratio of pixels subjected to noise removal.

According to a second aspect of the present invention, an image processing method comprises a noise detection step of performing noise detection on an image; a noise removal step of removing noise from a predetermined region of the image, on the basis of the result of the noise detection; an arithmetic step of obtaining the ratio of an area targeted for noise removal to the predetermined region of the image, from the result of the noise detection; a statistics calculation step of obtaining the statistics on the ratios obtained in the arithmetic step over a predetermined period of time; an image generation step of generating an image indicating the statistics, on the basis of the statistics obtained in the statistics calculation step; and an image composition step of superimposing the image generated in the image generation step on the image before being subjected to noise removal in the noise removal step or on the image from which noise has been removed, to generate a composite image for display. Therefore, when noise removal is performed on an image, the viewer can easily know the ratio of pixels subjected to noise removal, for every predetermined period of time.

According to a third aspect of the present invention, an image processing method comprises a noise detection step of detecting the position and intensity of noise in an image; a noise removal step of removing noise from a predetermined region of the image, on the basis of the position and intensity of noise detected in the noise detection step; an arithmetic step of obtaining, for each intensity level of noise, the ratio of an area targeted for noise removal to the predetermined region of the image, on the basis of the position and intensity of noise detected in the noise detection step; and an image generation step of generating an image indicating the ratio for each intensity level of noise, on the basis of the ratio obtained in the arithmetic step. Therefore, when noise removal is performed on an image, the viewer can easily know how much noise is removed, for each intensity level of noise, whereby the user interface is improved.

According to a fourth aspect of the present invention, an image processing method comprises a noise detection step of performing detection of position and intensity of noise, on an image; a noise removal step of removing noise from a predetermined region of the image, on the basis of the position and intensity of noise detected in the noise detection step; an arithmetic step of obtaining, for each intensity level of noise, the ratio of an area targeted for noise removal to the predetermined region of the image, on the basis of the position and intensity of noise detected in the noise detection step; a statistics calculation step of obtaining, for each intensity level of noise, the statistics on the ratios obtained in the arithmetic step over a predetermined period of time; an image generation step of generating an image indicating the statistics, for each intensity level of noise, on the basis of the statistics obtained in the statistics calculation step; and an image composition step of superimposing the image generated in the image generation step on the image before being subjected to noise removal in the noise removal step or on the image from which noise has been removed, to generate a composite image for display. Therefore, when noise removal is performed on an image, the viewer can easy know how much noise is removed for each intensity level, for every predetermined period of time, whereby the user interface is improved.

According to a fifth aspect of the present invention, an image processing method comprises a noise detection step of detecting the position and intensity of noise in an image; a noise removal step of removing noise from the image, on the basis of the position and intensity of noise detected in the noise detection step; an image generation step of generating an image indicating pixels included in an area of the image targeted for noise removal, using a predetermined color according to the intensity of noise, on the basis of the position and intensity of noise detected in the noise detection step; and an image composition step of superimposing the image generated in the image generation step on the image before being subjected to noise removal in the noise removal step or on the image from which noise has been removed, to generate a composite image for display. Therefore, when noise removal is performed on an image, the viewer can easily know the position of pixels subjected to noise removal as well as how much noise is removed.

According to a sixth aspect of the present invention, an image processing method comprises a noise detection step of detecting noise in an image; a noise removal step of removing noise from the image on the basis of the result of the noise detection; and an image composition step of spatially combining a part of the image before being subjected to noise removal in the noise removal step with a part of the image from which noise has been removed, to generate a composite image for display. Therefore, the viewer can see the images before and after noise removal at the same time to know, as an image, how much noise component is removed.

According to a seventh aspect of the present invention, in the image processing method defined in the fifth aspect, the intensity of the noise detected in the noise detection step is only one, and the color of the image generated in the image generation step is only one. Therefore, the viewer can easily know the position of pixels subjected to noise removal as well as how much noise is removed.

According to an eighth aspect of the present invention, in the image processing method defined in the sixth aspect, the image composition step comprises cutting partial images of the same region from the image before being subjected to noise removal in the noise removal step and the image from which noise has been removed, respectively, and generating an image in which the partial images are arranged vertically or horizontally. Therefore, the viewer can easily compare the image before noise removal with the image after noise removal to know how much noise component is removed.

According to a ninth aspect of the present invention, the image processing method defined in any of the first to sixth aspects further comprises an image decoding step of decoding an image code sequence to generate a decoded image; the noise detection step of performing noise detection using information included in the image code sequence; and the noise removal step of removing noise from the decoded image obtained in the image decoding step, on the basis of the result of the noise detection. Therefore, when performing noise removal on a decoded image obtained by decoding an image code sequence, the viewer can easily know how many pixels are subjected to noise removal.

According to a tenth aspect of the present invention, in the image processing method defined in any of the first to sixth aspects, the noise is one of a blocking artifact and a ringing artifact. Therefore, most conspicuous noise included in an image can be removed, and the viewer can easily know how many pixels are subjected to noise removal.

According to an eleventh aspect of the present invention, in the image processing method defined in any of the first to sixth aspects, the predetermined region to be subjected to noise removal in the noise removal step is an assembly of pixels in the vicinity of boundaries of each block. Therefore, blocking artifact can be detected effectively as compared with the case of processing the whole frame.

According to a twelfth aspect of the present invention, an image processing apparatus comprises noise detection means for performing noise detection on an input image; noise removal means for removing noise from a predetermined region of the input image, on the basis of the result of the noise detection; arithmetic means for obtaining the ratio of an area targeted for noise removal to the predetermined region of the input image, on the basis of the result of the noise detection; and image generation means for generating an image indicating the ratio, on the basis of the ratio obtained by the arithmetic means. Therefore, when noise removal is performed on an image, the viewer can easily know the ratio of pixels subjected to noise removal.

According to a thirteenth aspect of the present invention, an image processing apparatus comprises noise detection means for performing noise detection on an input image; noise removal means for removing noise from a predetermined region of the input image, on the basis of the result of the noise detection; arithmetic means for obtaining the ratio of an area targeted for noise removal to the predetermined region of the input image, from the result of the noise detection; statistics calculation means for obtaining the statistics on the ratios obtained by the arithmetic means over a predetermined period of time; image generation means for generating an image indicating the statistics, on the basis of the statistics obtained by the statistics calculation means; and image composition means for superimposing the image generated by the image generation means on the image before being subjected to noise removal by the noise removal means or on the image from which noise has been removed, to generate a composite image for display. Therefore, when noise removal is performed on an image, the viewer can easily know the ratio of pixels subjected to noise removal, for every predetermined period of time.

According to a fourteenth aspect of the present invention, an image processing apparatus comprises noise detection means for performing detection of position and intensity of noise, on an input image; noise removal means for removing noise from a predetermined region of the input image, on the basis of the position and intensity of noise detected by the noise detection means; arithmetic means for obtaining, for each intensity level of noise, the ratio of an area targeted for noise removal to the predetermined region of the input image, on the basis of the position and intensity of noise detected by the noise detection means; and image generation means for generating an image indicating the ratio for each intensity level of noise, on the basis of the ratio obtained by the arithmetic means. Therefore, when noise removal is performed on an image, the viewer can easily know how much noise is removed, for each intensity level of noise, whereby the user interface is improved.

According to a fifteenth aspect of the present invention, an image processing apparatus comprises noise detection means for performing detection of position and intensity of noise, on an input image; noise removal means for removing noise from a predetermined region of the input image, on the basis of the position and intensity of noise detected by the noise detection means; arithmetic means for obtaining, for each intensity level of noise, the ratio of an area targeted for noise removal to the predetermined region of the input image, on the basis of the position and intensity of noise detected by the noise detection means; statistics calculation means for obtaining, for each intensity level of noise, the statistics on the ratios obtained by the arithmetic means over a predetermined period of time; image generation means for generating an image indicating the statistics, for each intensity level of noise, on the basis of the statistics obtained by the statistics calculation means; and image composition means for superimposing the image generated by the image generation means on the image before being subjected to noise removal by the noise removal means or on the image from which noise has been removed, to generate a composite image for display. Therefore, when noise removal is performed on an image, the viewer can easy know how much noise is removed for each intensity level, for every predetermined period of time, whereby the user interface is improved.

According to a sixteenth aspect of the present invention, an image processing apparatus comprises noise detection means for performing detection of position and intensity of noise, on an input image; noise removal means for removing noise from the input image, on the basis of the position and intensity of noise detected by the noise detection means; image generation means for generating an image indicating pixels included in an area of the input image targeted for noise removal, using a predetermined color according to the intensity of noise, on the basis of the position and intensity of noise detected by the noise detection means; and image composition means for superimposing the image generated by the image generation means on the image before being subjected to noise removal by the noise removal means or on the image from which noise has been removed, to generate a composite image for display. Therefore, when noise removal is performed on an image, the viewer can easily know the position of pixels subjected to noise removal as well as how much noise is removed.

According to a seventeenth aspect of the present invention, an image processing apparatus comprises noise detection means for performing noise detection on an input image; noise removal means for removing noise from the input image on the basis of the result of the noise detection; and image composition means for receiving the input image and the output image from the noise removal means, and spatially combining a part of the input image with a part of the output image from the noise removal means, to generate a composite image to be output. Therefore, the viewer can see the images before and after noise removal at the same time to know, as an image, how much noise component is removed.

According to an eighteenth aspect of the present invention, in the image processing apparatus defined in the sixteenth aspect, the intensity of the noise detected by the noise detection means is only one, and the color of the image generated by the image generation means is only one. Therefore, the viewer can easily know the position of pixels subjected to noise removal as well as how much noise is removed.

According to a nineteenth aspect of the present invention, in the image processing apparatus defined in the seventeenth aspect, the image composition means cuts partial images of the same region from the input image and the output image from the noise removal means, respectively, and generates an image in which the partial images are arranged vertically or horizontally. Therefore, the viewer can easily compare the image before noise removal with the image after noise removal to know how much noise component is removed.

According to a twentieth aspect of the present invention, the image processing apparatus defined in any of the twelfth to seventeenth aspects further comprises image decoding means for decoding an image code sequence to generate a decoded image; the noise detection means receiving the image code sequence, and performing noise detection using information included in the image code sequence; and the noise removal means removing noise from the decoded image outputted from the image decoding means, on the basis of the result of the noise detection. Therefore, when performing noise removal on a decoded image obtained by decoding an image code sequence, the viewer can easily know how many pixels are subjected to noise removal.

According to a twenty-first aspect of the present invention, in the image processing apparatus defined in any of the twelfth to seventeenth aspects, the noise is one of blocking artifact and ringing artifact. Therefore, most conspicuous noise included in an image can be removed, and the viewer can easily know how many pixels are subjected to noise removal.

According to a twenty-second aspect of the present invention, in the image processing apparatus defined in any of the twelfth to seventeenth aspects, the predetermined region to be subjected to noise removal by the noise removal means is an assembly of pixels in the vicinity of boundaries of each block. Therefore, blocking artifact can be detected effectively as compared with the case of processing the whole frame.

DETAILED DESCRIPTION OF THE PREFERRED EMBODIMENTS

[Embodiment 1]

Figure 1:
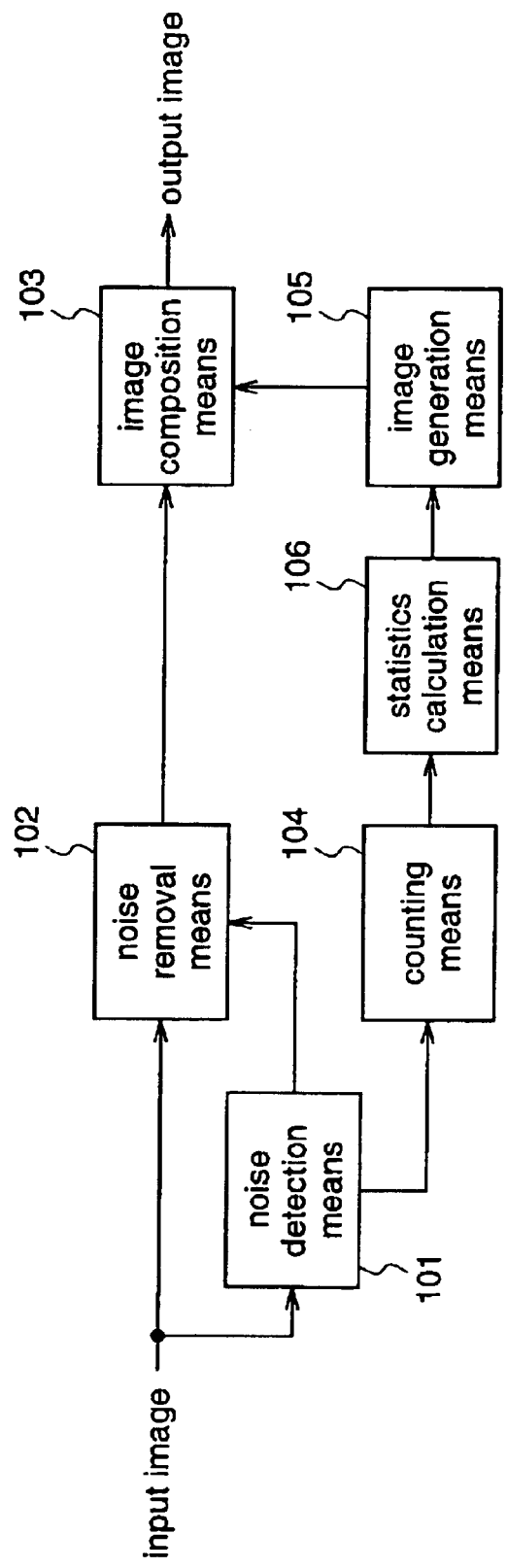
FIG. 1 is a block diagram illustrating the construction of an image processing apparatus according to first, second, third, and fourth embodiments of the present invention.

Hereinafter, a first embodiment of the present invention will be described with reference to FIG. 1. FIG. 1 is a block diagram illustrating the construction of an image processing apparatus according to the first embodiment.

The image processing apparatus comprises a noise detection means 101, a noise removal means 102, an image composition means 103, a counting means (an arithmetic means) 104, an image generation means 105, and a statistics calculation means 106.

An input image is supplied to the noise detection means 101 and the noise removal means 102. The noise detection means 101 performs noise detection on the input image. To be specific, the above-mentioned noise detection method disclosed in Japanese Patent No. 2643636 is used to detect blocking artifact, and a noise detection method disclosed in, for example, Japanese Published Patent Application No. Hei.11-112983 is used to detect ringing artifact.

The noise detection means 101 outputs information such as the position of noise or the like detected from the input image, to the noise removal means 102 and the counting means 104. Assuming that the noise detection means 101 performs noise detection in pixel units, this information indicates pixels to be subjected to noise removal. Assuming that the noise detection means 101 performs noise detection in block units or block boundary units, this information indicates blocks or block boundaries to be subjected to noise removal.

The noise removal means 102 performs noise removal on the input image on the basis of the result of noise detection supplied from the noise detection means 101. To be specific, the noise removal methods disclosed in the above-mentioned literatures can be used. Thereafter, the noise removal means 102 outputs the image which has been subjected to noise removal, to the image composition means 103.

The counting means 104 counts the number of pixels or blocks which have been detected as targets of noise removal, on the basis of the result of noise detection supplied from the noise detection means 101.

Figure 2:
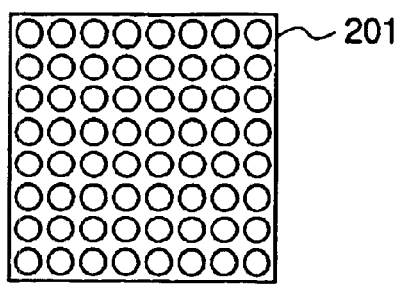
FIGS. 2(a)–2(c) are schematic diagrams of images for explaining an image processing method according to the first embodiment of the invention.
Figure 2:
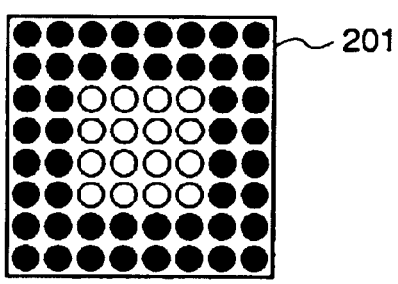
Figure 2:
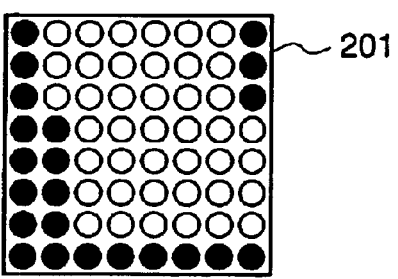

Hereinafter, noise detection in pixel units will be described. Usually, blocking artifact occurs in pixels in the vicinity of the boundaries (edges) of a block. Assuming that coding is performed with a block 201 comprising 8×8 pixels shown in FIG. 2(a) as a unit, blocking artifact occurs in pixels in the vicinity of the boundary of the block 201. When it is premised that noise removal is performed on at most two lines of pixels from the boundaries of the block 201, forty-eight pixels shown by black dots in FIG. 2(b) are the maximum range of pixels to be subjected to noise removal in the block 201. It is now assumed that the noise removal means 102 performs noise removal on twenty-two pixels in the block 201, shown by black dots in FIG. 2(c).

The counting means 104 counts the number of pixels which are decided as target pixels to be subjected to noise removal by the noise removal means 102. Then, the counting means 104 calculates the ratio of this number of pixels to the maximum number of pixels to be subjected to noise removal, on a percentage basis. For example, assuming that the number of blocks in a frame is 5400, the maximum number of pixels to be subjected to noise removal is 259200. So, when the number of pixels which are decided as targets of noise removal is 100000, about 39% of pixels are subjected to noise removal.

In this case, instead of the ratio to the maximum number of pixels to be subjected to noise removal, the ratio to the number of all pixels may be obtained. On the other hand, all pixels in the block 201 have the risk of ringing artifact. Therefore, the counting means 104 calculates the ratio of the number of pixels decided as targets of noise removal to the number of all pixels, and outputs the result of calculation to the statistics calculation means 106.

When the noise detection means 101 performs noise detection in units of blocks or block boundaries, the counting means 104 counts the number of blocks or block boundaries to be subjected to noise removal, and calculates the ratio of the result of counting to the number of all blocks or block boundaries.

The statistics calculation means 106 obtains the statistics of the counting results outputted from the counting means 104 over a predetermined period of time. This period is, for example, a period corresponding to one field, one frame, or several GOPs (group of pictures) based on MPEG coding, or a period ranging from 0.5 sec. to a few sec. When the input image is a still image or when it is a moving image and the predetermined period is one field or one frame, the statistics calculation means 106 outputs the result of calculation from the counting means 104 as it is. In this case, the statistics calculation means 106 may be dispensed with. Further, the statistics may be one or some of the average value, minimum value, maximum value and the like. The statistics calculation means 106 outputs the obtained statistics to the image generation means 105.

Figure 3:
FIGS. 3(a)–3(c) are schematic diagrams of images for explaining the image processing method according to the first embodiment of the invention.
Figure 3:
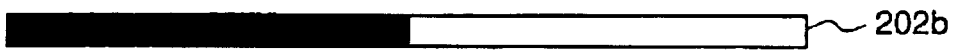
Figure 3:

The image generation means 105 generates a bar-graph image indicating the statistics, on the basis of the statistics outputted from the statistics calculation means 106. Examples of images generated by the image generation means 105 are shown in FIGS. 3(a)–3(c). FIG. 3(a) shows a bar-graph image 202a when the output value from the statistics calculation means 106 is 0%, FIG. 3(b) shows a bar-graph image 202b when the output value from the statistics calculation means 106 is 50%, and FIG. 3(c) shows a bar-graph image 202c when the output value from the statistics calculation means 106 is 100%. In this way, the image generation means 105 generates a bar-graph image indicating the percentage of pixels which are targeted for noise removal, on the basis of the value outputted from the statistics calculation means 106, and outputs it to the image composition means 103.

Figure 4:
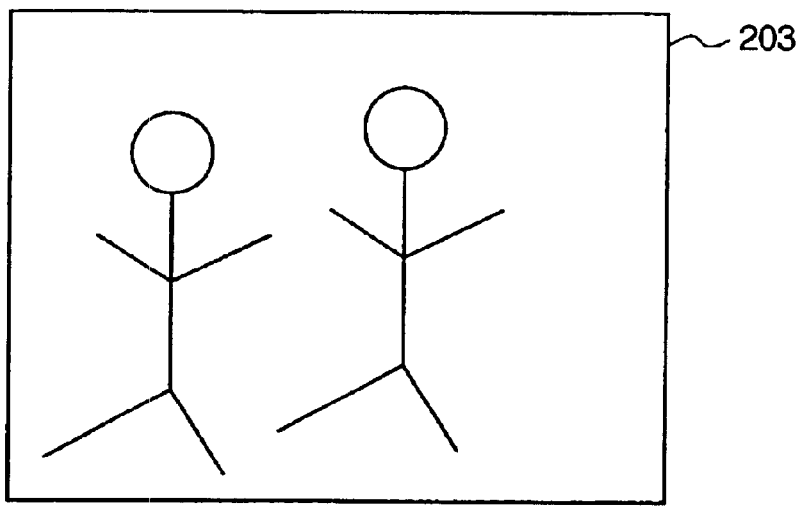
FIGS. 4(a)–4(c) are schematic diagrams of images for explaining the image processing method according to the first embodiment of the invention.
Figure 4:
Figure 4:
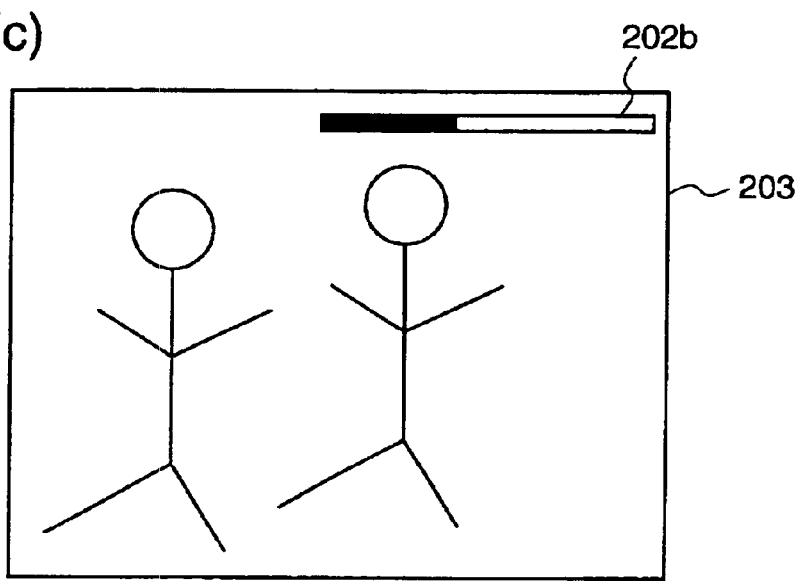

The image composition means 103 combines the image outputted from the noise removal means 102 with the image outputted from the image generation means 105. For example, assuming that FIG. 4(a) shows an output image 203 from the noise removal means 102 and FIG. 4(b) shows a bar-graph image 202b outputted from the image generation means 105, the image composition means 103 superimposes the bar-graph image 202b on the image 203 to generate a composite image shown in FIG. 4(c) to be output.

As described above, the image processing apparatus according to the first embodiment performs noise detection and noise removal on the input image, counts the number of pixels or blocks which are decided as targets of noise removal, calculates the ratio of the number of pixels or blocks from which noise is removed to the whole, obtains the statistics of the result of calculation over a predetermined period of time, generates a bar-graph image indicating the statistics, superimposes the generated image on the image after noise removal, and outputs the composite image. Therefore, when noise removal is performed on the input image, the viewer can easily know the ratio of pixels which have been subjected to noise removal to the whole image or a region of the image.

[Embodiment 2]

Hereinafter, a second embodiment of the present invention will be described with reference to FIG. 1. In this second embodiment, the operations of the image generation means 105 and the image composition means 103 are different from those of the first embodiment, and the operations of the noise detection means 101, the noise removal means 102, the counting means 104, and the statistics calculation means 106 are identical to those of the first embodiment. Therefore, only the operations of the image generation means 105 and the image composition means 103 will be described hereinafter.

The image generation means 105 generates an image for displaying the statistics outputted from the statistics calculation means 106. At this time, a font table indicating numeric characters is prepared in the image generation means 105, and a text image is generated with reference to the font table. In this way, the image generation means 105 generates an image of a numeric character indicating the percentage of pixels which are targeted for noise removal, on the basis of the value outputted from the statistics calculation means 106, and outputs the image to the image composition means 103.

Figure 5:
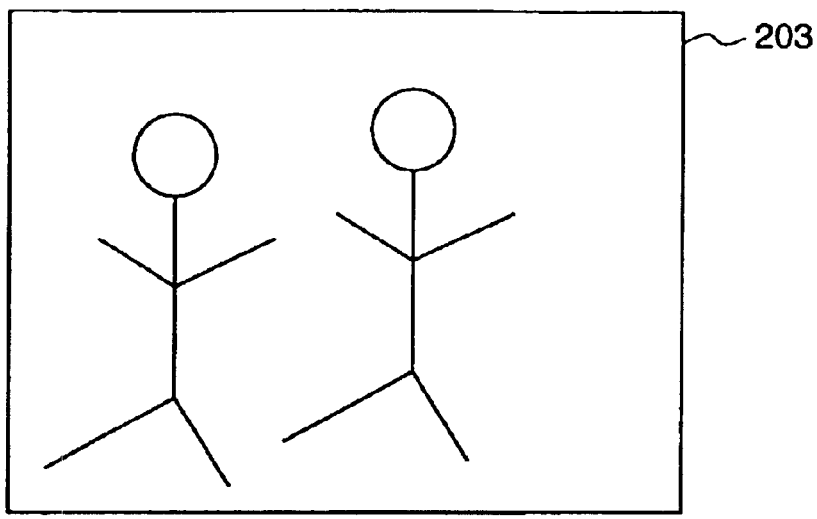
FIGS. 5(a)–5(c) are schematic diagrams of images for explaining an image processing method according to the second embodiment of the invention.
Figure 5:
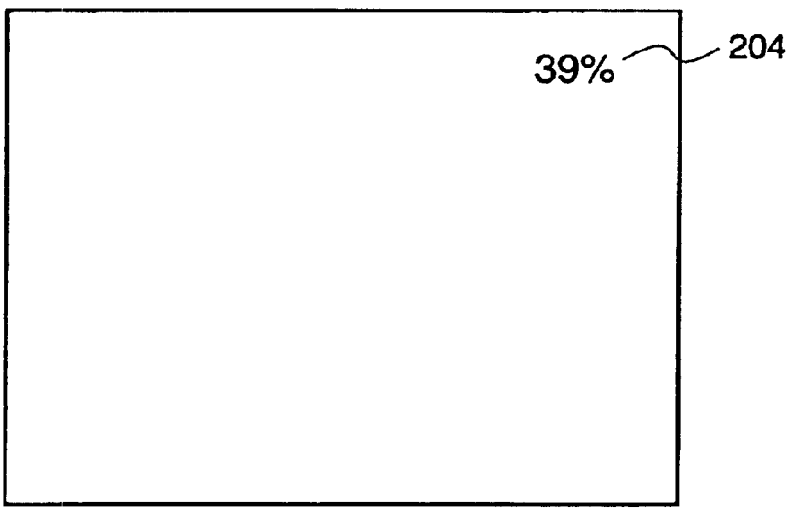
Figure 5:
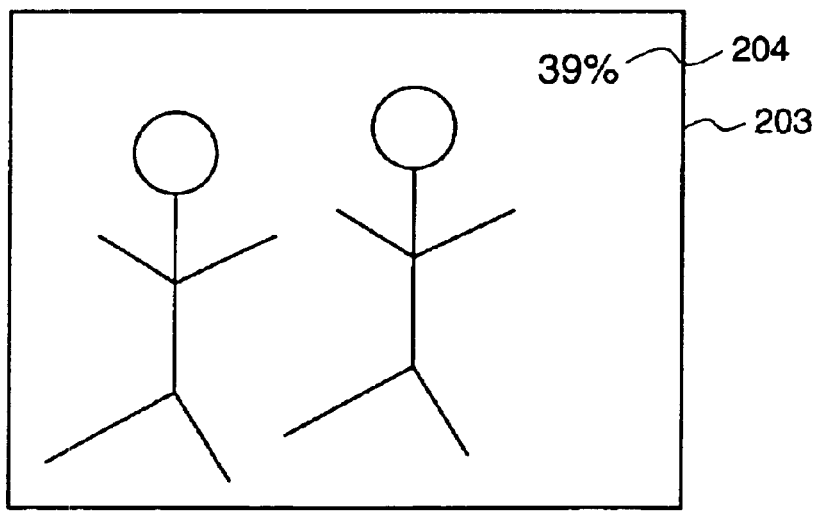

The image composition means 103 superimposes the image outputted from the image generation means 105 on the image outputted from the noise removal means 102. Assuming that FIG. 5(a) shows an output image 203 outputted from the noise removal means 102 and FIG. 5(b) shows a text image 204 outputted from the image generation means 105, the image composition means 103 superimposes the text image 204 on the image 203 to generate a composite image shown in FIG. 5(c) to be output.

As described above, the image processing apparatus according to the second embodiment performs noise detection and noise removal on an input image, counts the number of pixels or blocks which are decided as targets of noise removal, calculates the ratio of the number of pixels or blocks from which noise is removed to the whole, obtains the statistics of the result of calculation over a predetermined period of time, generates a text image indicating the numeric value of the statistics, and superimposes the text image on the image after noise removal to generate a composite image to be output. Therefore, when noise removal is performed on the input image, the viewer can easily know the ratio of pixels which have been subjected to noise removal, to the whole image or a region of the image.

[Embodiment 3]

Hereinafter, a third embodiment of the present invention will be described with reference to FIG. 1. In this third embodiment, the operations of the image generation means 105 and the image composition means 103 are different from those of the first embodiment, and the operations of the noise detection means 101, the noise removal means 102, the counting means 104, and the statistics calculation means 106 are identical to those of the first embodiment. Therefore, only the operations of the image generation means 105 and the image composition means 103 will be described hereinafter.

The image generation means 105 receives the statistics outputted from the statistics calculation means 106, and classifies the statistics into predetermined levels. For example, when the statistics is classified into three levels, "large", "medium", and "small", the statistics is "small" when the result of calculation outputted from the statistics calculation means 106 is 0~33%, "medium" when the result of calculation is 34~66%, and "large" when the result of calculation is 67~100%. The number of levels is not restricted to three. Then, an image indicating the level of the statistics is generated. For example, a text image like "large", "medium" or "small" may be generated with reference to a font table. Alternatively, a color image, a symbol, or the like, which is predetermined for each level, may be generated. In this way, the image generation means 105 generates an image of text, symbol, or color for indicating, among the predetermined levels, the level to which the number of pixels targeted for noise removal belongs, and outputs the generated image to the image composition means 103.

Figure 6:
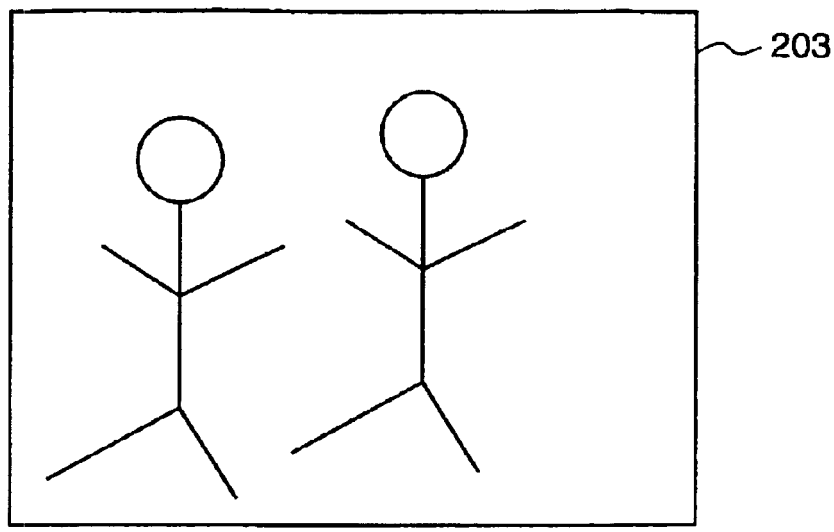
FIGS. 6(a)–6(c) are schematic diagrams of images for explaining an image processing method according to the third embodiment of the invention.
Figure 6:
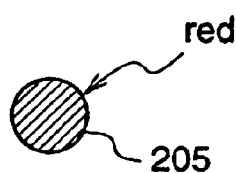
Figure 6:
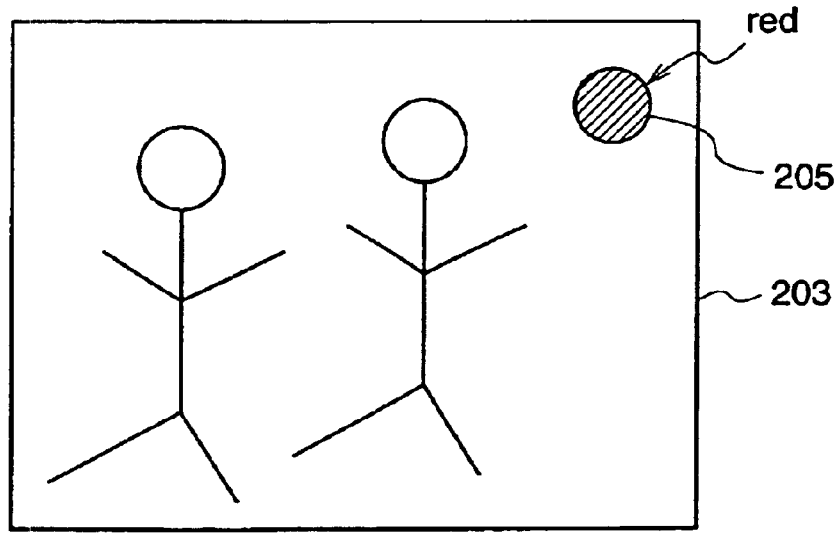

The image composition means 103 superimposes the image outputted from the image generation means 105 on the image outputted from the noise removal means 102. For example, assuming that FIG. 6(a) shows an output image 203 from the noise removal means 102 and FIG. 6(b) shows a red image 205 outputted from the image generation means 105, the image composition means 103 superimposes the red image 105 on the image 203 to generate a composite image shown in FIG. 6(c) to be output.

As described above, the image processing apparatus according to the second embodiment performs noise detection and noise removal on an input image, counts the number of pixels or blocks which are decided as targets of noise removal, calculates the ratio of the number of pixels or blocks from which noise is removed to the whole, obtains the statistics of the result of calculation over a predetermined period of time, generates an image of text, symbol, or color indicating, among predetermined levels, the level to which the number of pixels targeted for noise removal belongs, on the basis of the statistics, and superimposes the generated image on the image after noise removal to generate a composite image to be output. Therefore, when noise removal is performed on the input image, the viewer can easily know the ratio of pixels subjected to noise removal, to the whole image or a region of the image.

[Embodiment 4]

Hereinafter, a fourth embodiment of the present invention will be described with reference to FIG. 1. This fourth embodiment is different from the first embodiment in that the noise detection means 101 of this fourth embodiment detects the intensity of noise as well as the position of noise while the noise detection means 101 of the first embodiment detects only the position of noise.

An input image is supplied to the noise detection means 101 and the noise removal means 102. The noise detection means 101 performs noise detection on the input image. Then, the noise detection means 101 outputs information such as the position and intensity of the noise detected from the input image, to the noise removal means 102 and the counting means 104.

The noise removal means 102 performs noise removal on the input image on the basis of the result of noise detection supplied from the noise detection means 101. At this time, the intensity of noise supplied from the noise detection means 101 may be used.

The counting means 104 counts how many pixels or blocks have been detected as targets of noise removal, on the basis of the result of noise detection supplied from the noise detection means 101. Although the counting method is fundamentally identical to that described for the first embodiment, counting is performed for each intensity level of noise in this fourth embodiment. For example, assuming that the noise detection means 101 detects the intensity of noise in three levels (low, medium, high), the number of pixels or blocks being targets of noise removal is counted for each intensity level. Then, the ratio of the number of pixels or blocks obtained as the result of counting to the maximum number of pixels or blocks to be subjected to noise removal is calculated on a percentage basis. The result of calculation is output to the image generation means 105.

The statistics calculation means 106 obtains the statistics of the result of calculation outputted from the counting means 104, over a predetermined period of time. Although the fundamental operation is identical to that described for the first embodiment, the statistics is obtained for each intensity level of noise in this fourth embodiment. For example, assuming that the noise detection means 101 detects the intensity of noise in three levels (low, medium, high), the statistics of the result of calculation outputted from the counting means 104 is obtained for each intensity level. The statistics calculation means 106 outputs the obtained statistics to the image generation means 105.

Figure 7:
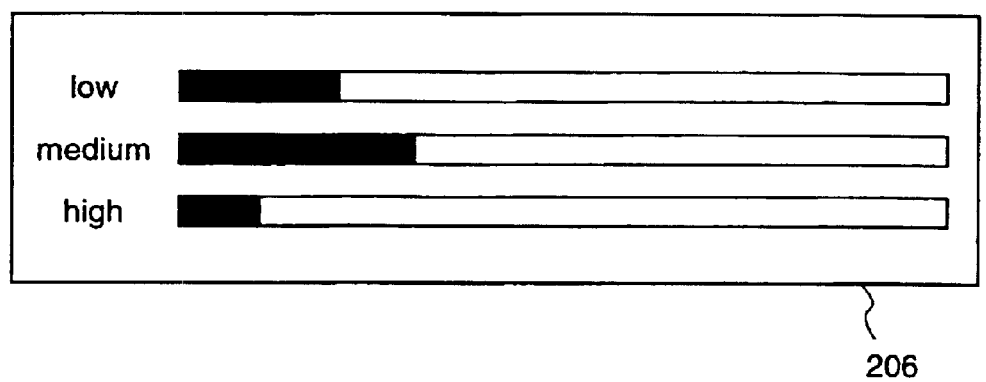
FIGS. 7(a) and 7(b) are schematic diagrams of images for explaining an image processing method according to the fourth embodiment of the invention.
Figure 7:
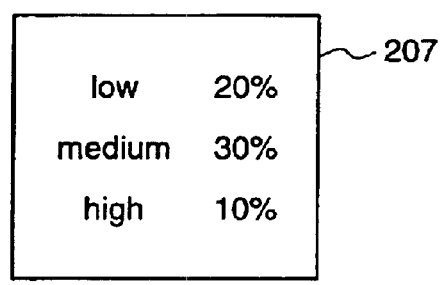

The image generation means 105 generates a bar-graph image or a text image which indicates the statistics, for each intensity level of noise, on the basis of the statistics outputted from the statistics calculation means 106. FIGS. 7(a) and 7(b) show examples of images generated by the image generation means 105. FIGS. 7(a) and 7(b) show a bar-graph image 206 and a text image 207, respectively, in the case where the statistics of noise whose intensity is "low" is 20%, the statistics of noise whose intensity is "medium" is 30%, and the statistics of noise whose intensity is "high" is 10%. In this way, the image generation means 105 generates a bar-graph image or a text image indicating the percentage of pixels subjected to noise removal, on the basis of the values based on different intensity levels of noise, which are outputted from the counting means 104. Then, the image generation means 105 outputs the generated image to the image composition means 103.

Figure 8:
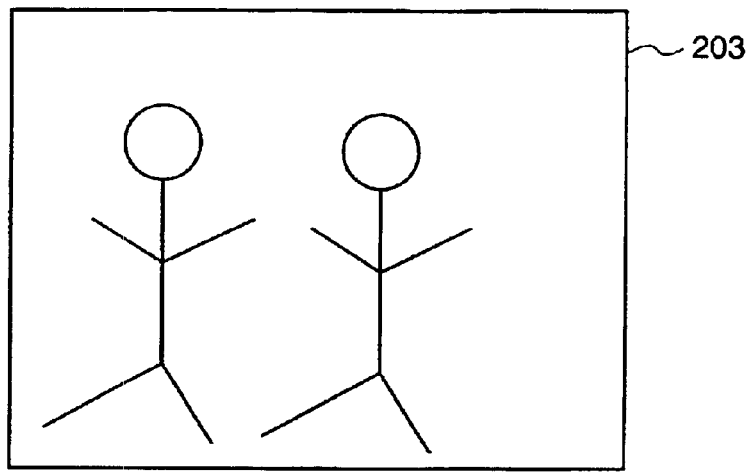
FIGS. 8(a)–8(c) are schematic diagrams of images for explaining the image processing method according to the fourth embodiment of the invention.
Figure 8:
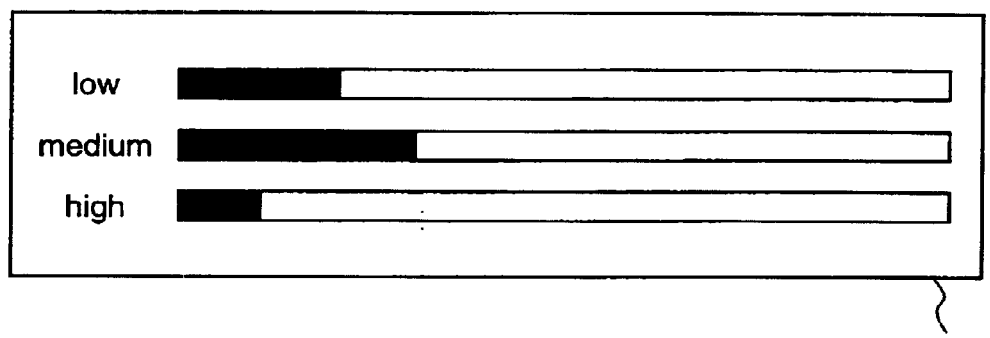
Figure 8:
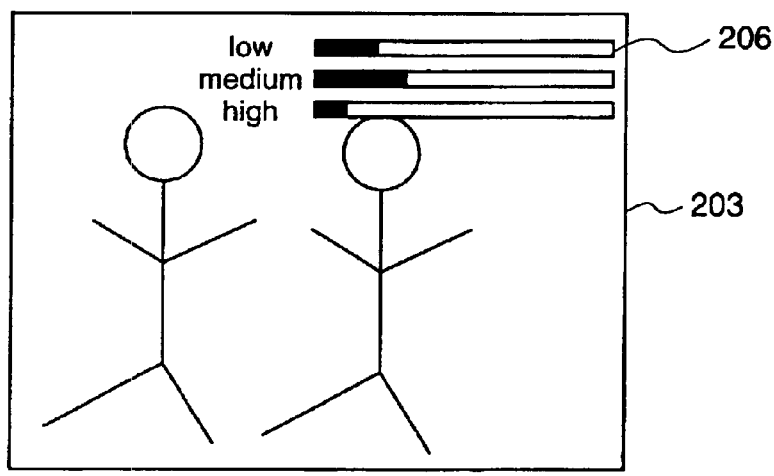

The image composition means 103 superimposes the image outputted from the image generation means 105 on the image outputted from the noise removal means 102. For example, assuming that FIG. 8(a) shows an output image 203 from the noise removal means 102 and FIG. 8(b) shows a bar-graph image 206 outputted from the image generation means 105, the image composition means 103 superimposes the bar-graph image 206 on the image 203 to generate a composite image shown in FIG. 8(c) to be output.

As described above, the image processing apparatus of this fourth embodiment performs noise detection and noise removal on an input image, counts the number of pixels or blocks which have been decided as targets of noise removal, for each intensity level of noise, calculates the ratio of the pixels or blocks from which noise is removed to the whole, obtains the statistics of the result of calculation for each intensity level of noise, generates a bar-graph image or a text image indicating the statistics for each intensity level of noise, and superimposes the generated image on the image after noise removal to generate a composite image to be output. Therefore, when noise removal is performed on the input image, the viewer can easily know, for each intensity level of noise, how much noise is removed from the whole image or a region of the image, whereby the user interface is improved.

[Embodiment 5]

Figure 9:
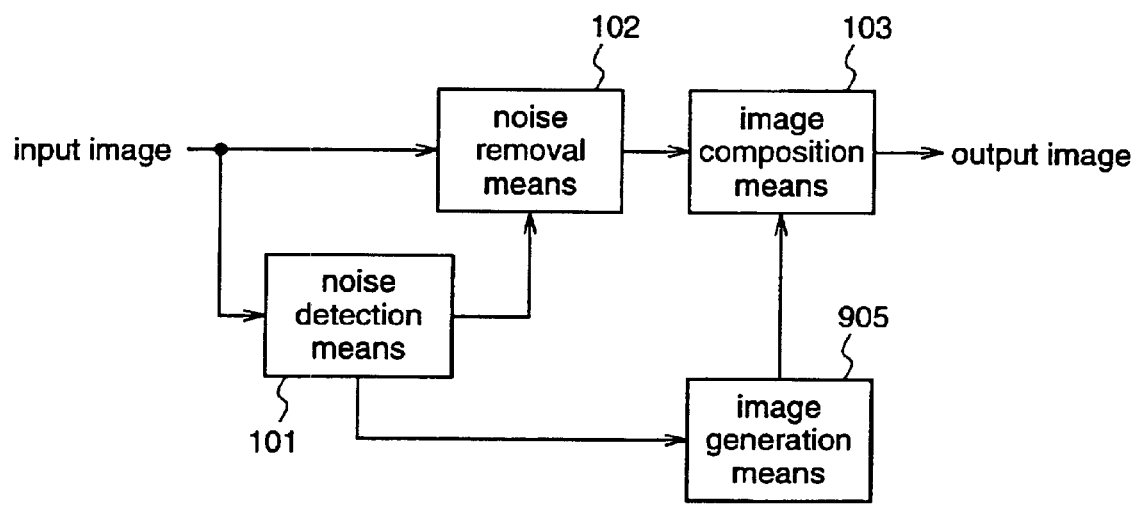
FIG. 9 is a block diagram illustrating the construction of an image processing apparatus according to a fifth embodiment of the present invention.

Hereinafter, a fifth embodiment of the present invention will be described with reference to FIG. 9. FIG. 9 is a block diagram illustrating the construction of an image processing apparatus according to the fifth embodiment.

The image processing apparatus comprises a noise detection means 101, a noise removal means 102, an image composition means 103, and an image generation means 905.

Since the operations of the noise detection means 101 and the noise removal means 102 are identical to those described for the first embodiment, repeated description is not necessary. In this fifth embodiment, however, the result of detection by the noise detection means 101 is output to the image generation means 905.

The image generation means 905 generates an image for displaying the result of noise detection supplied from the noise detection means 101. At this time, the image generation means 905 generates an image indicating, with a specific color, regions which have been decided as targets of noise removal by the noise detection means 101. The minimum units of the regions to be decided as targets of noise removal depend on the units of noise detection performed by the noise detection means 101, i.e., pixels, blocks, block boundaries, or the like. With respect to the color showing the regions decided as targets of noise removal, all of these regions may be displayed with the same color, or different colors may be used for different intensity levels of nose detected by the noise detection means 101. Assuming that the intensity of noise is divided into three levels "low", "medium", and "high", blue, yellow, and red may be used for "low", "medium", and "high", respectively.

Figure 10:
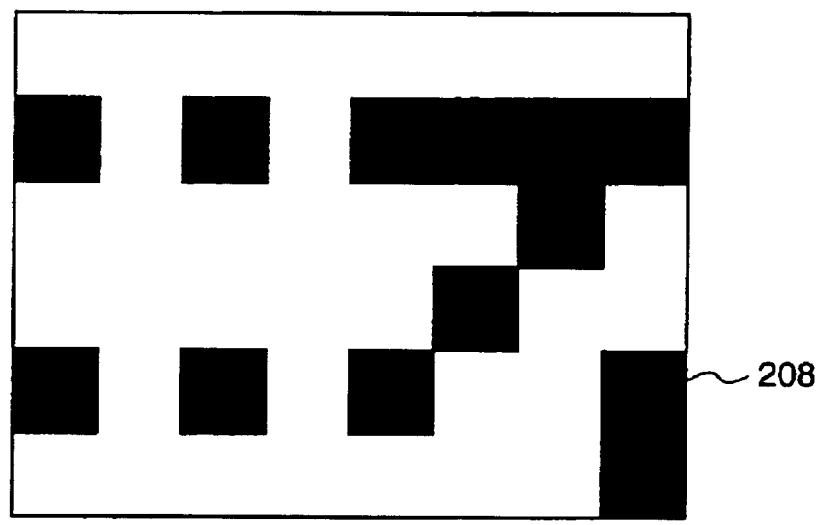
FIGS. 10(a) and 10(b) are schematic diagrams of images for explaining an image processing method according to the fifth embodiment of the invention.
Figure 10:
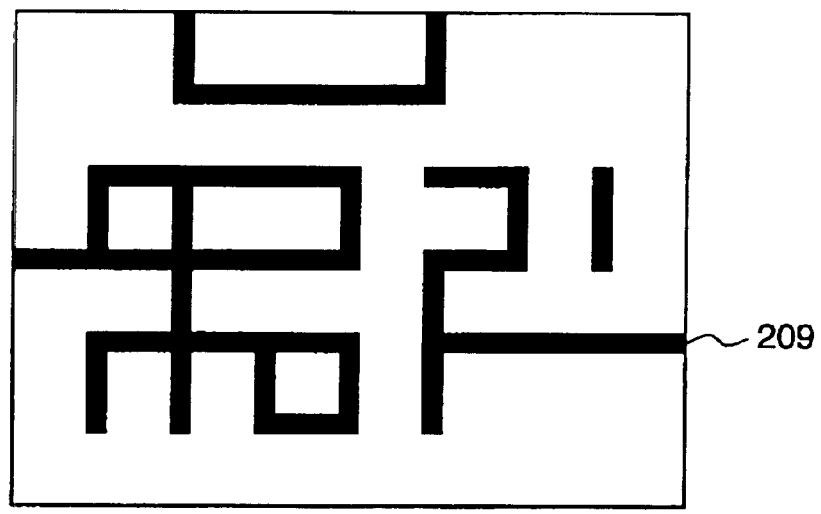

FIGS. 10(a) and 10(b) show examples of images generated by the image generation means 905. In FIGS. 10(a) and 10(b), the solidly shaded regions are images 208 and 209 indicating regions decided as targets of noise removal, respectively. FIG. 10(a) shows an example in the case where noise detection is performed block by block, and FIG. 10(b) shows an example in the case where noise detection is performed block-boundary by block-boundary. The image generated by the image generation means 905 is output to the image composition means 103.

Figure 11:
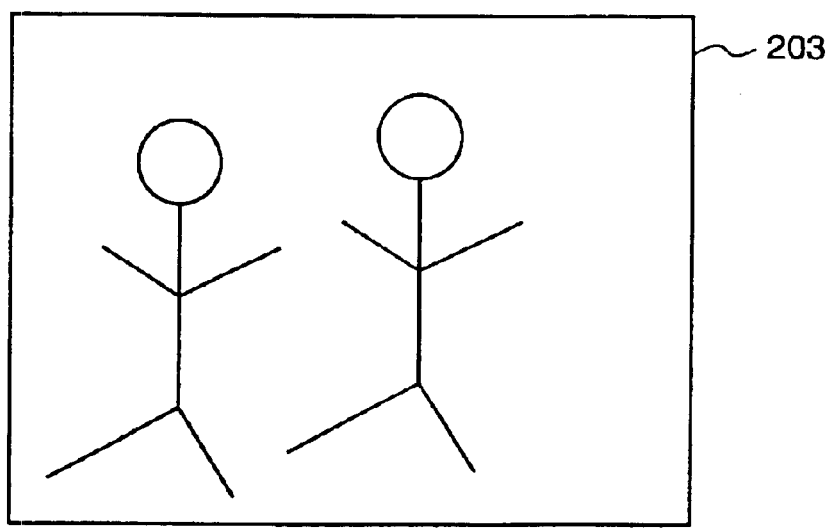
FIGS. 11(a)–11(c) are schematic diagrams of images for explaining the image processing method according to the fifth embodiment.
Figure 11:
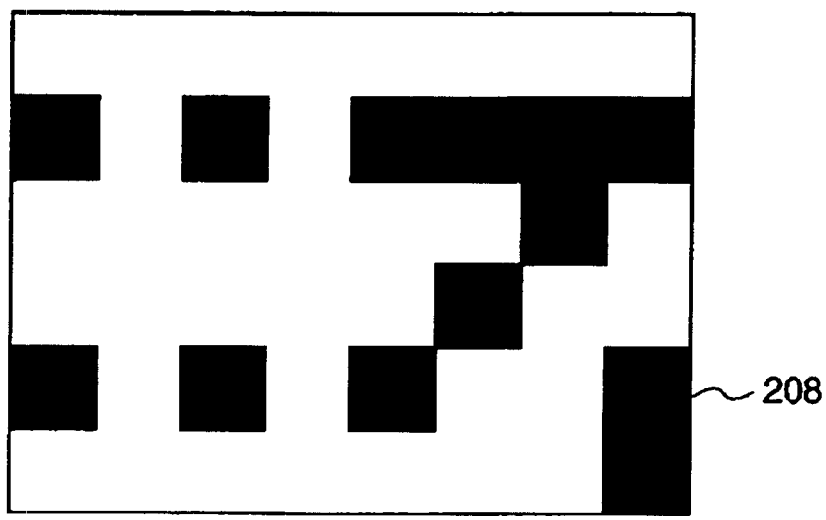
Figure 11:
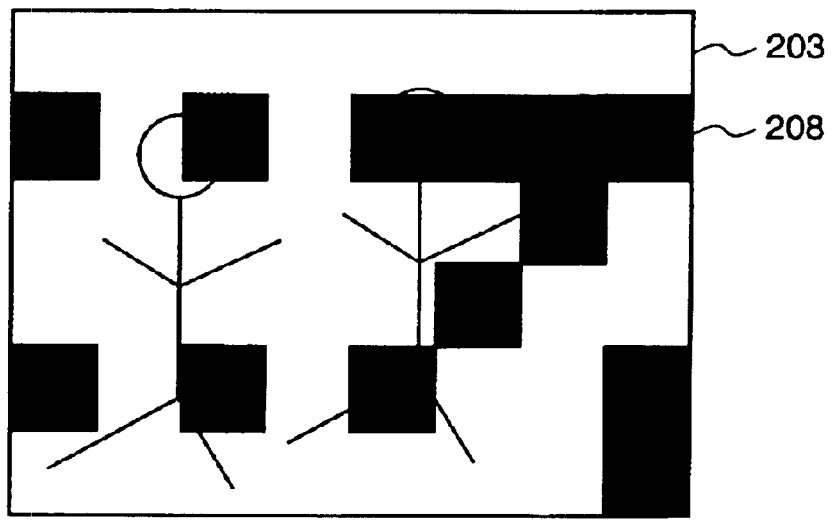

The image composition means 103 superimposes the image outputted from the image generation means 105 on the image outputted from the noise removal means 102. For example, assuming that FIG. 11(a) shows an output image 203 from the noise removal means 102 and FIG. 11(b) shows an output image 208 from the image generation means 905, the image composition means 103 superimposes the image 208 on the image 203 to generate a composite image shown in FIG. 11(c) to be output.

As described above, the image processing apparatus according to the fifth embodiment performs noise detection and noise removal on an input image, and superimposes pixels or blocks decided as targets of noise removal, which are shown by a specific color, on the image after noise removal. Therefore, when noise removal is performed on the input image, the viewer can easily know the position of pixels subjected to noise removal as well as how much noise is removed.

[Embodiment 6]

Figure 12:
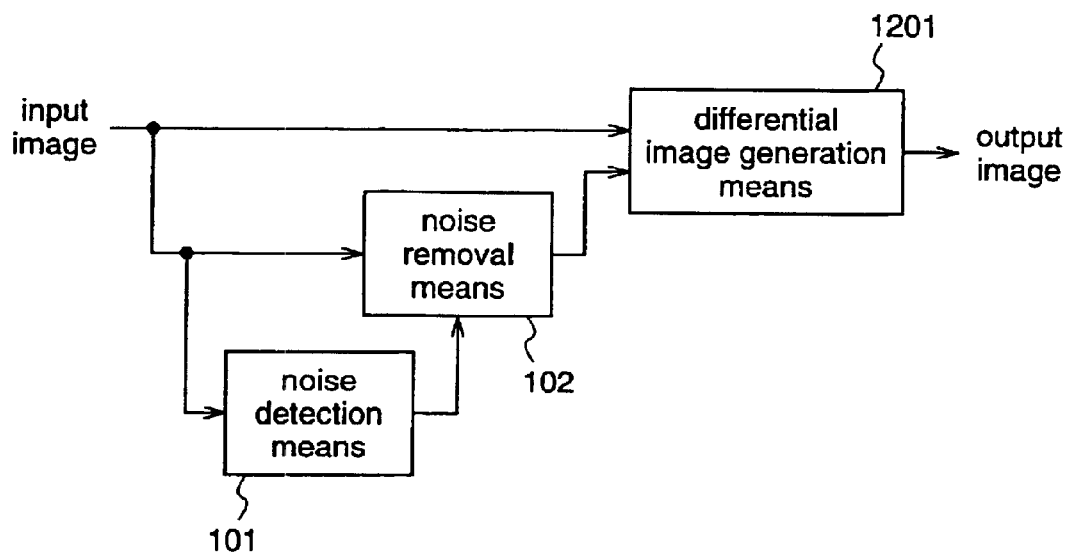
FIG. 12 is a block diagram illustrating the construction of an image processing apparatus according to a sixth embodiment of the present invention.

Hereinafter, a sixth embodiment of the present invention will be described with reference to FIG. 12. FIG. 12 is a block diagram illustrating the construction of an image processing apparatus according to the sixth embodiment.

The image processing apparatus comprises a noise detection means 101, a noise removal means 102, and a differential image generation means 1201.

An input image is supplied to the noise detection means 101, the noise removal means 102, and the differential image generation means 1201. Since the operations of the noise detection means 101 and the noise removal means 102 are identical to those already described for the first embodiment, repeated description is not necessary. The image subjected to noise removal by the noise removal means 102 is input to the differential image generation means 1201.

The differential image generation means 1201 receives the input image and the image outputted from the noise removal means 102, and generates a differential image of these images. That is, it generates an image of noise components removed from the input image by the noise-removal means 102, and outputs the image.

As described above, the image processing apparatus of this sixth embodiment performs noise detection and noise removal on an input image, generates a differential image between the input image and the image from which noise is removed, and outputs the differential image. Therefore, the viewer can easily know, as an image, how much noise component is actually removed in the process of noise removal.

[Embodiment 7]

Figure 13:
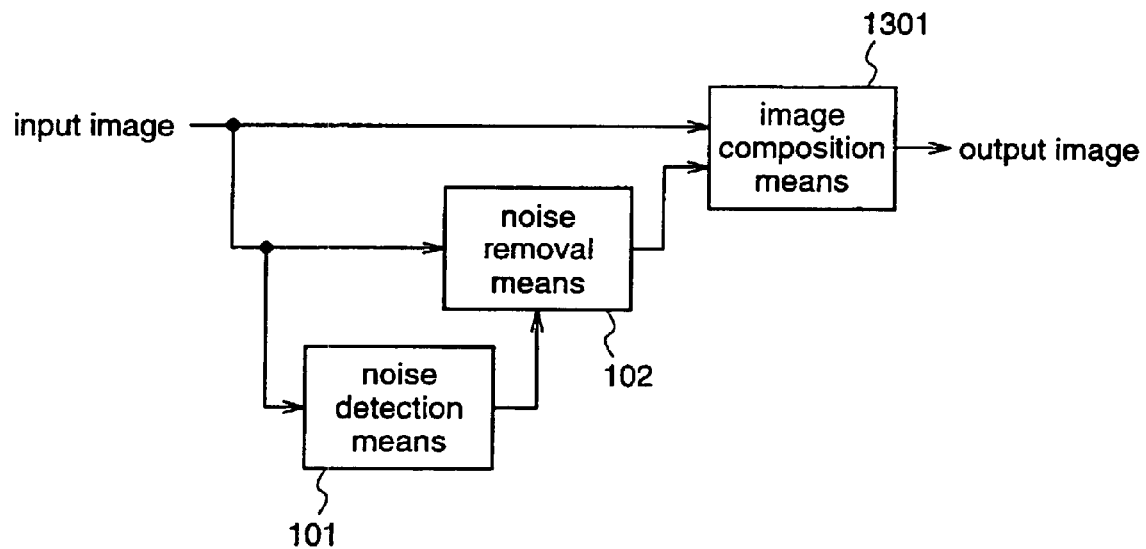
FIG. 13 is a block diagram illustrating the construction of an image processing apparatus according to a seventh embodiment of the present invention.

Hereinafter, a seventh embodiment of the present invention will be described with reference to FIG. 13. FIG. 13 is a block diagram illustrating the construction of an image processing apparatus according to the seventh embodiment.

The image processing apparatus comprises a noise detection means 101, a noise removal means 102, and an image composition means 1301.

An input image is supplied to the noise detection means 101, the noise removal means 102, and the image composition means 1301. Since the operations of the noise detection means 101 and the noise removal means 102 are identical to those described for the first embodiment, repeated description is not necessary. The image subjected to noise removal by the noise removal means 102 is input to the image composition means 1301.

Figure 14:
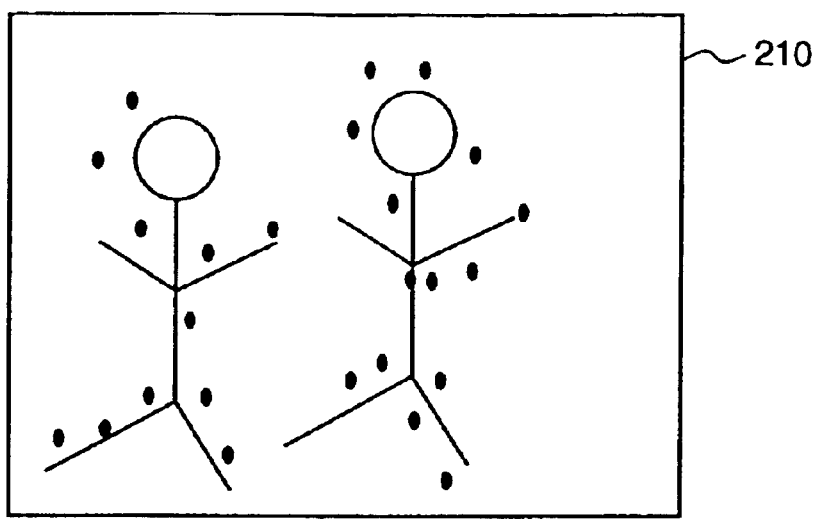
FIGS. 14(a)–14(c) are schematic diagrams of images for explaining an image processing method according to the seventh embodiment of the invention.
Figure 14:
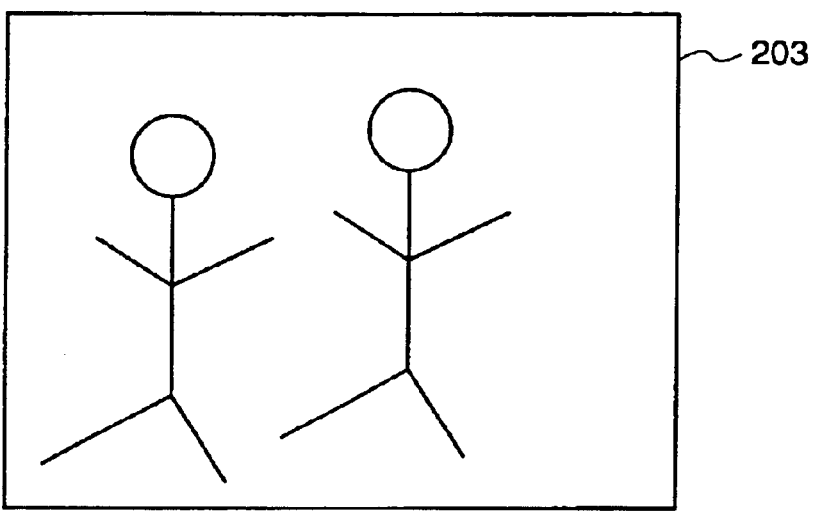
Figure 14:
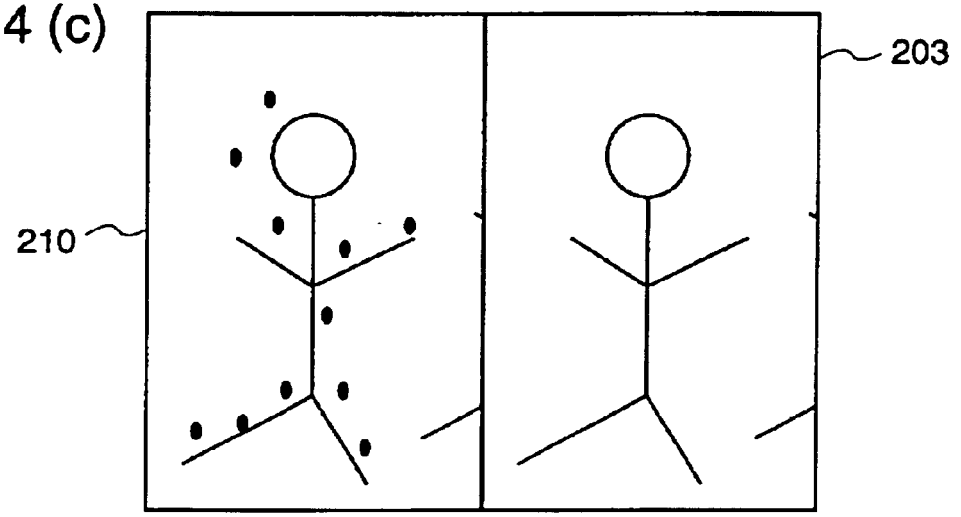

The image composition means 1301 receives the input image and the image outputted from the noise removal means 102, and combines these images to output a composite image. For example, assuming that FIG. 14(a) shows an input image 210 and FIG. 14(b) shows an image 203 outputted from the noise removal means 102, the image composition means 1301 combines the left half of the image 203 and the left half of the image 210 to generate an image shown in FIG. 14(c), and outputs the image.

As described above, the image processing apparatus according to the seventh embodiment performs noise detection and noise removal on an input image, generates an image in which the image from which noise is removed is combined with the input image in one frame, and outputs the image. Therefore, the viewer can see both of the image before noise removal and the image after noise removal at the same time to know, as an image, how much noise component is actually removed.

[Embodiment 8]

Figure 15:
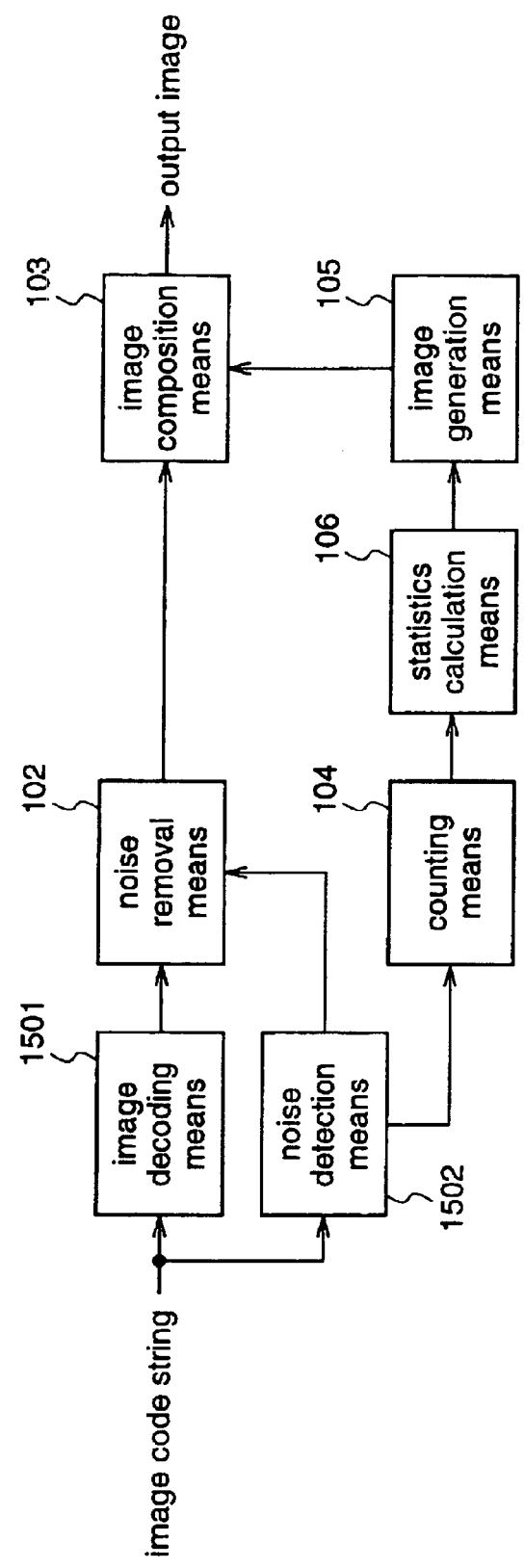
FIG. 15 is a block diagram illustrating the construction of an image processing apparatus according to an eighth embodiment of the present invention.

Hereinafter, an eighth embodiment of the present invention will be described with reference to FIG. 15. FIG. 15 is a block diagram illustrating the construction of an image processing apparatus according to the eighth embodiment.

The image processing apparatus comprises an image decoding means 1501, a noise detection means 1502, a noise removal means 102, an image composition means 103, a counting means 104, an image generation means 105, and a statistics calculation means 106.

This eighth embodiment is different from the first embodiment in that the noise detection means of this eighth embodiment detects noise by using an image code sequence while the noise detection means of the first embodiment detects noise by using an input image.

An image code sequence is input to the image decoding means 1501 and the noise detection means 1502. The image decoding means 1501 decodes the inputted image code sequence, and outputs a decoded image to the noise removal means 102.

The noise detection means 1502 performs noise detection on the decoded image by using information obtained from the image code sequence. To be specific, blocking artifact is detected using a method described in, for example, Japanese Published Patent Application No. Hei.11-238884, and ringing artifact is detected using a method described in, for example, Japanese Published Patent Application No. Hei.11-239606.

The noise detection means 1502 outputs information such as the position of noise or the like, which is detected using the information obtained from the image code sequence, to the noise removal means 102 and the counting means 104. Assuming that the noise detection means 1502 performs noise detection pixel by pixel, this information indicates which pixel is to be subjected to noise removal. Assuming that noise detection is performed block by block or block-boundary by block-boundary, this information indicates which block or block boundary is to be subjected to noise removal.

The noise removal means 102 performs noise removal on the decoded image supplied from the image decoding means 1501, on the basis of the result of noise detection supplied from the noise detection means 1502. To be specific, those methods disclosed in the above-mentioned literatures may be used. The image subjected to noise removal is output to the image composition means 103.

The counting means 104 counts how many pixels or blocks are detected as targets of noise removal, on the basis of the result of noise detection supplied from the noise detection means 1502. The counting method is identical to that described for the first embodiment and, therefore, does not require repeated description.

The statistics calculation means 106 obtains the statistics of the result outputted from the counting means 104, over a predetermined period of time. This operation is identical to that described for the first embodiment and, therefore, does not require repeated description.

As described above, the image processing apparatus of the eighth embodiment performs noise detection and noise removal on a decoded image by using information obtained from an image code sequence, counts the number of pixels or blocks which are decided as targets of noise removal, calculates the ratio of the number of pixels or blocks from which noise is removed to the whole, obtains the statistics of the result of calculation over a predetermined period of time, generates an image indicating the result, and combines the generated image with the image after noise removal. Therefore, when noise removal is performed on an image obtained by decoding an image code sequence, the viewer can easily know the ratio of pixels or blocks subjected to noise removal, to the whole.

[Embodiment 9]

Figure 16:
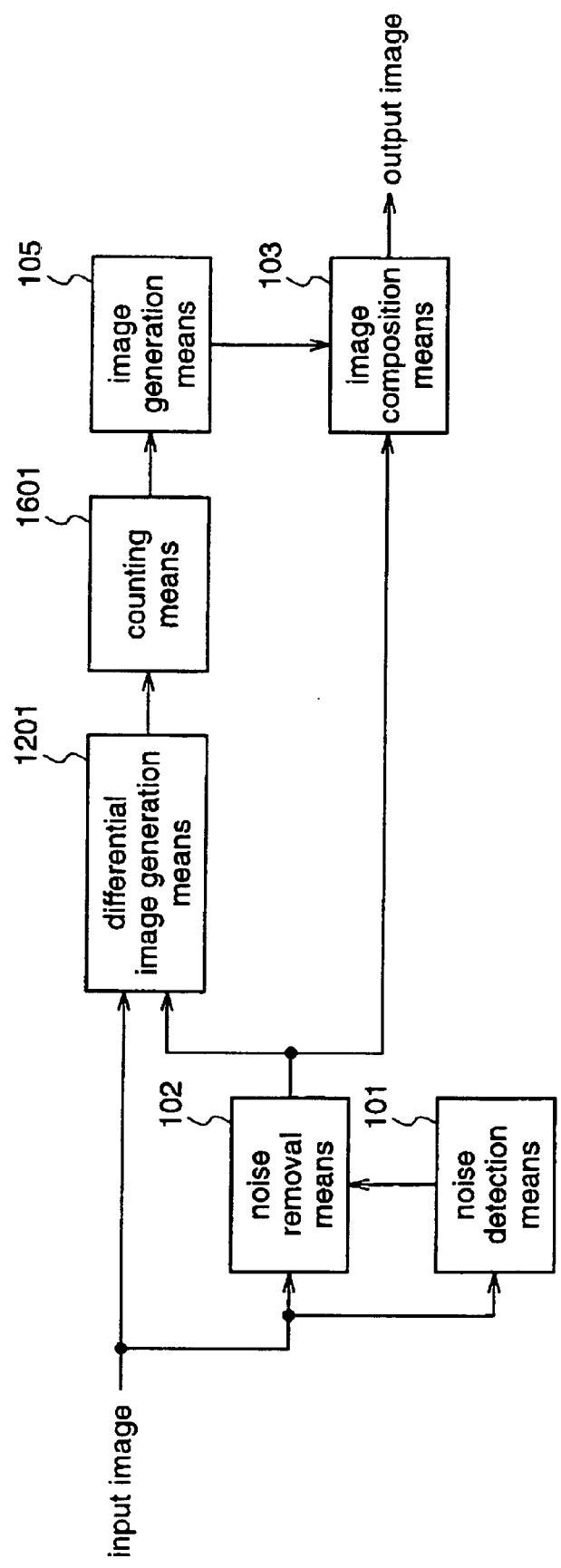
FIG. 16 is a block diagram illustrating the construction of an image processing apparatus according to a ninth embodiment of the present invention.

Hereinafter, a ninth embodiment of the present invention will be described with reference to FIG. 16. FIG. 16 is a block diagram illustrating the construction of an image processing apparatus according to the ninth embodiment.

The image processing apparatus comprises a noise detection means 101, a noise removal means 102, a differential image generation means 1201, a counting means 1601, an image generation means 105, and an image composition means 103.

An input image is supplied to the noise detection means 101, the noise removal means 102, and the differential image generation means 1201. Since the operations of the noise detection means 101, the noise removal means 102, and the differential image generation means 1201 are identical to those described for the sixth embodiment, repeated description is not necessary. The image subjected to noise removal by the noise removal means 102 is supplied to the differential image generation means 1201 and the image composition means 102. The differential image generation means 1201 generates a differential image between the input image and the image after noise removal, and outputs it to the counting means 1601.

On receipt of the differential image outputted from the differential image generation means 1201, the counting means 1601 counts the number of pixels whose absolute values of differential image components become equal to or larger than a predetermined value. Then, the counting means 1601 calculates the ratio of the counted number of pixels to the number of all pixels, and outputs the result of calculation to the image generation means 105.

Since the operations the image generation means 105 and the image composition means 103 are identical to those described for the first embodiment, repeated description is not necessary.

As described above, the image processing apparatus of this ninth embodiment performs noise detection and noise removal on an input image, generates a differential image between the input image and the image subjected to noise removal, counts the number of pixels whose absolute values of differential image components are equal to or larger than a predetermined value (noise pixels), obtains the ratio of the number of the noise pixels to the number of all pixels, generates an image indicating the obtained ratio, and combines the generated image with the image after noise removal to generate a composite image to be output. Therefore, the viewer can easily know, as an image, how much noise component is actually removed when performing noise removal.

While in the aforementioned embodiments the method of counting the number of pixels to be subjected to noise removal is described taking blocking artifact and ringing artifact as examples, the counting method can also be applied to removal of other kinds of noise, for example, noise in the time axis direction.

While in the aforementioned embodiments the range on which the counting means 1601 performs counting is the whole frame, this range is not restricted thereto. For example, only a central portion of a frame may be subjected to counting, or each of plural areas into which a frame is divided may be subjected to counting.

Figure 17:
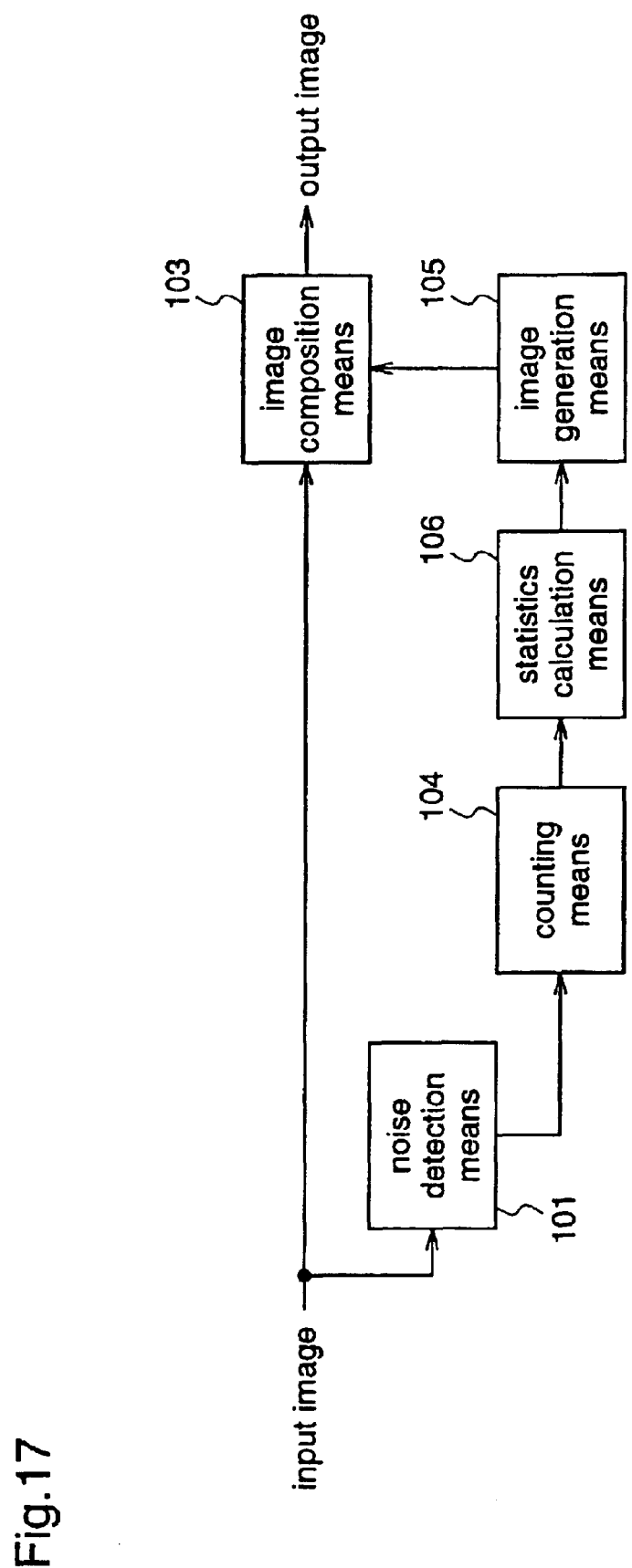
FIG. 17 is a block diagram illustrating the construction of a modification of the image processing apparatus according to the first embodiment of the invention.

While in the first embodiment the image composition means 103 combines the images outputted from the noise removal means 102 and the image generation means 105, it may combine the input image with the image outputted from the image generation means 105. In this case, the construction of the image processing apparatus is as shown in FIG. 17. The same can be said of the second to fifth, eighth, and ninth embodiments.

Figure 18:
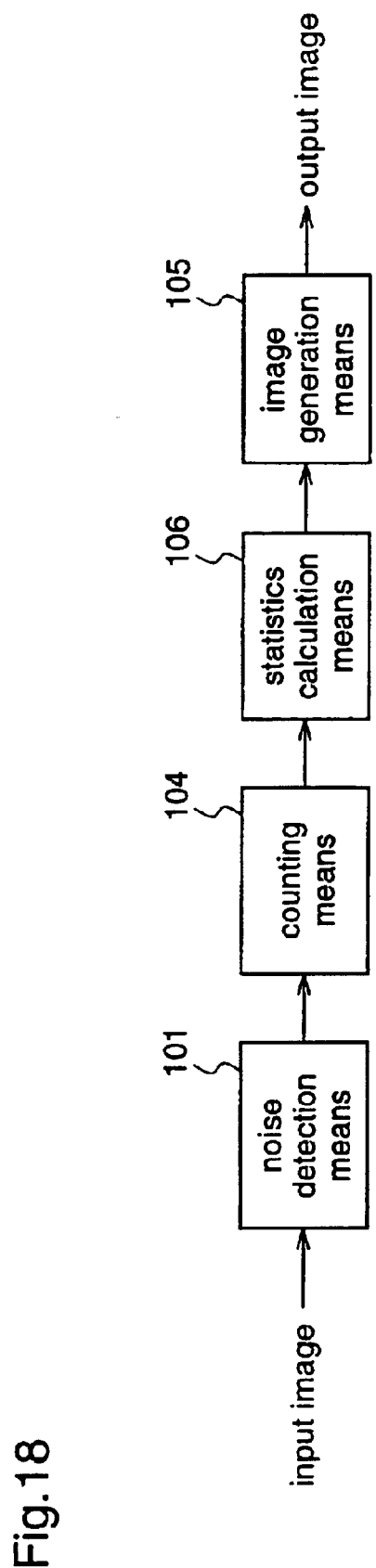
FIG. 18 is a block diagram illustrating the construction of another modification of the image processing apparatus according to the first embodiment of the invention.

While in the first embodiment the image composition means 103 combines the images outputted from the noise removal means 102 and the image generation means 105, the composition means 103 may output only the image outputted from the image generation means 105. In this case, the construction of the image processing apparatus is as shown in FIG. 18. The same can be said of the second to fifth, eighth, and ninth embodiments.

Figure 19:
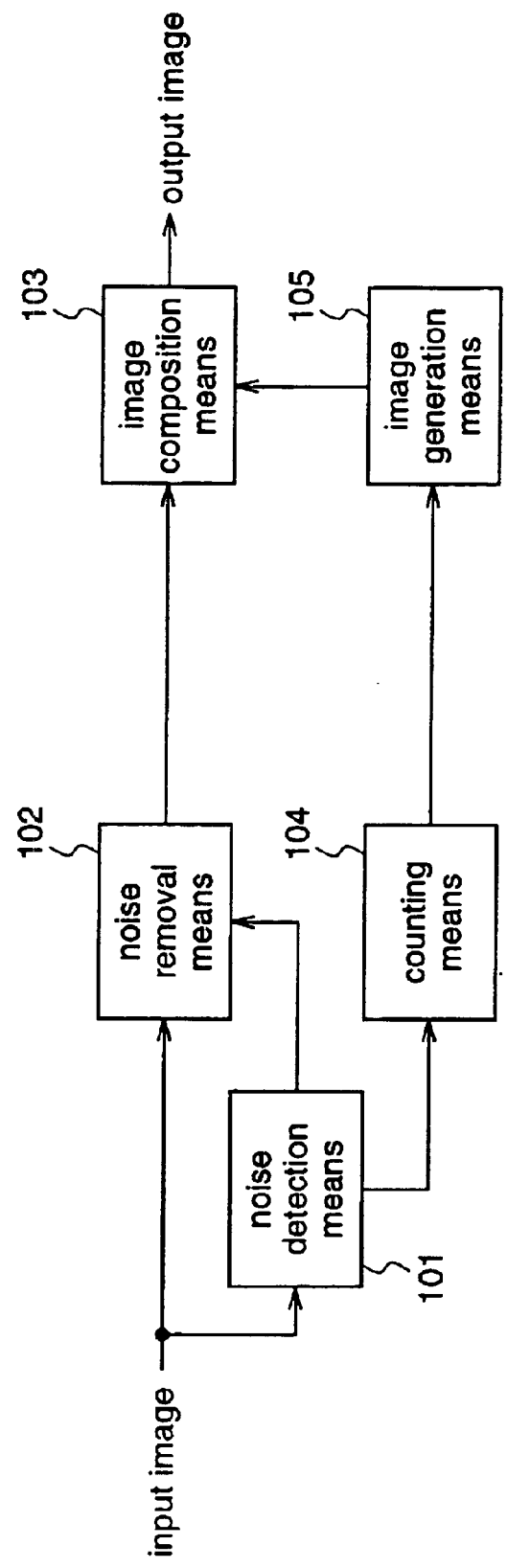
FIG. 19 is a block diagram illustrating the construction of still another modification of the image processing apparatus according to the first embodiment of the invention.

In the first embodiment, when the input image is a still image or when the input image is a moving image and a predetermined period during which counting is performed is one field or one frame, the statistics calculation means 106 outputs the result of calculation performed by the counting means 104 as it is. In this case, the statistics calculation means may be dispensed with, and the construction of the image processing apparatus becomes as shown in FIG. 19. The same can be said of the second to fourth, eighth, and ninth embodiments.

While in the first embodiment the shape of the bar-graph image generated by the image generation means 105 is described with reference to FIGS. 3(a)–3(c), the shape of the image is not restricted thereto.

Furthermore, in the first embodiment of the invention, the image generation means 105 generates a bar-graph image and superimposes it on the image after noise removal. In the second embodiment, the image generation means 105 generates a text image and superimposes it on the image after noise removal. In the third embodiment, the image generation means 105 generates an image of text, symbol, or color indicating the noise level and superimposes it on the image after noise removal. However, the image generation means 105 may generate all of these images at the same time and superimpose them on the image after noise removal.

Further, while in the fourth embodiment the image generation means 105 generates a bar-graph image for each intensity level of noise, it may generate a numeric value, text, symbol, or color for each intensity level of noise.

Further, while in the seventh embodiment the image composition means 1301 combines the left half portion of the input image with the left half portion of the image outputted from the noise removal means 102, the composition means 1301 may cut out arbitrary portions of the images, and it may combine the portions at arbitrary positional relationship.

Further, while in the eighth embodiment noise detection using an image code sequence is described as a modification of the first embodiment, it is also applicable to any of the second to seventh embodiments.

Further, while in the ninth embodiment detection of noise pixels from a differential image between images before and after noise removal is described as a modification of the first embodiment, it is also applicable to the second to seventh embodiments.

What is claimed is:

1. An image processing method comprising:

performing noise detection to an image;

removing noise from a predetermined region of the image, on the basis of the result of the noise detection;

obtaining the ratio of an area targeted for noise removal to the predetermined region of the image, on the basis of the result of the noise detection;

generating an image indicating the ratio, on the basis of the ratio obtained in said obtaining the ratio; and superimposing the image generated in said generating an image on the image before being subjected to noise removal in said removing noise or on the image from which noise has been removed, to generate a composite image for display.

2. An image processing method comprising:

performing noise detection to an image;

removing noise from a predetermined region of the image, on the basis of the result of the noise detection;

obtaining the ratio of an area targeted for noise removal to the predetermined region of the image, from the result of the noise detection;

obtaining the statistics on the ratios obtained in said obtaining the ratio over a predetermined period of time;

generating an image indicating the statistics, on the basis of the statistics obtained in said obtaining the statistics; and superimposing the image generated in said generating an image on the image before being subjected to noise removal in said removing noise or on the image from which noise has been removed, to generate a composite image for display.

3. An image processing method comprising:

detecting the position and intensity of noise in an image;

removing noise from a predetermined region of the image, on the basis of the position and intensity of noise detected in said detecting;

obtaining, for each intensity level of noise, the ratio of an area targeted for noise removal to the predetermined region of the image, on the basis of the position and intensity of noise detected in said detecting; and generating an image indicating the ratio for each intensity level of noise, on the basis of the ratio obtained in said obtaining; and superimposing the image generated in said generating on the image before being subjected to noise removal in said removing noise or on the image from which noise has been removed, to generate a composite image for display.

4. An image processing method comprising:

performing detection of position and intensity of noise, to an image;

removing noise from a predetermined region of the image, on the basis of the position and intensity of noise detected in said performing;

obtaining, for each intensity level of noise, the ratio of an area targeted for noise removal to the predetermined region of the image, on the basis of the position and intensity of noise, detected in said performing;

obtaining, for each intensity level of noise, the statistics on the ratios obtained in said obtaining the ratio over a predetermined period of time;

generating an image indicating the statistics, for each intensity level of noise on the basis of the statistics obtained in said obtaining the statistics; and superimposing the image generated in said generating an image on the image before being subjected to noise removal in said removing noise or on the image from which noise has been removed, to generate a composite image for display.

5. An image processing method comprising:

detecting the position and intensity of noise in an image;

removing noise from the image, on the basis of the position and intensity of noise detected in said detecting;

generating an image indicating pixels included in an area of the image targeted for noise removal, using a predetermined color according to the intensity of noise, on the basis of the position and intensity of noise detected in said detecting; and superimposing the image generated in said generating an image on the image before being subjected to noise removal in said removing noise or on the image from which noise has been removed, to generate a composite image for display.

6. An image processing method as defined in claim 5, wherein the intensity of the noise detected in said detecting is only one, and the color of the image generated in said generating is only one.

7. An image processing method comprising:

detecting noise in an image;

removing noise from the image on the basis of the result of said detecting noise; and spatially combining a part of the image before being subjected to noise removal in said removing noise and a part of the image from which noise has been removed so as to display the same on the screen, respectively, to generate a composite image for display, wherein said spatially combining comprises cutting partial images of the same region from the image before being subjected to noise removal in said removing noise and the image from which noise has been removed, respectively, and generating an image in which the partial images are arranged vertically or horizontally.

8. An image processing method as defined in claim 1 further comprising:

decoding an image code sequence to generate a decoded image;

performing noise detection using information included in the image code sequence; and removing noise from the decoded image obtained in said decoding, on the basis of the result of the noise detection.

9. An image processing method as defined in claim 1, wherein the noise is one of blocking artifact and ringing artifact.

10. An image processing method as defined in claim 1, wherein the predetermined region to be subjected to noise removal in said removing noise is an assembly of pixels in the vicinity of a boundary of each block.

11. An image processing apparatus comprising:

noise detection means for pefforming noise detection to an input image;

noise removal means for removing noise from a predetermined region of the input image, on the basis of the result of the noise detection;

arithmetic means for obtaining the ratio of an area targeted for noise removal to the predetermined region of the input image, on the basis of the result of the noise detection;

image generation means for generating an image indicating the ratio, on the basis of the ratio obtained by the arithmetic means; and image composition means for superimposing the image generated by the image generation means on the image before being subjected to noise removal by the noise removal means or on the image from which noise has been removed, to generate a composite image for display.

12. An image processing apparatus comprising:

noise detection means for performing noise detection to an input image;

noise removal means for removing noise from a predetermined region of the input image, on the basis of the result of the noise detection;

arithmetic means for obtaining the ratio of an area targeted for noise removal to the predetermined region of the input image, from the result of the noise detection;

statistics calculation means for obtaining the statistics on the ratios obtained by the arithmetic means over a predetermined period of time;

image generation means for generating an image indicating the statistics, on the basis of the statistics obtained by the statistics calculation means; and image composition means for superimposing the image generated by the image generation means on the image before being subjected to noise removal by the noise removal means or on the image from which noise has been removed, to generate a composite image for display.

13. An image processing apparatus comprising:

noise detection means for performing detection of position and intensity of noise, to an input image;

noise removal means for removing noise from a predetermined region of the input image, on the basis of the position and intensity of noise detected by the noise detection means;

arithmetic means for obtaining, for each intensity level of noise, the ratio of an area targeted for noise removal to the predetermined region of the input image, on the basis of the position and intensity of noise detected by the noise detection means;

image generation means for generating an image indicating the ratio for each intensity level of noise, on the basis of the ratio obtained by the arithmetic means; and image composition means for superimposing the image generated by the image generation means on the image before being subjected to noise removal by the noise removal means or on the image from which noise has been removed, to generate a composite image for display.

14. An image processing apparatus comprising:

noise detection means for performing detection of position and intensity of noise, to an input image;

noise removal means for removing noise from a predetermined region of the input image, on the basis of the position and intensity of noise detected by the noise detection means;

arithmetic means for obtaining, for each intensity level of noise, the ratio of an area targeted for noise removal to the predetermined region of the input image, on the basis of the position and intensity of noise detected by the noise detection means;

statistics calculation means for obtaining, for each intensity level of noise, the statistics on the ratios obtained by the arithmetic means over a predetermined period of time;

image generation means for generating an image indicating the statistics, for each intensity level of noise, on the basis of the statistics obtained by the statistics calculation means; and image composition means for superimposing the image generated by the image generation means on the image before being subjected to noise removal by the noise removal means or on the image from which noise has been removed, to generate a composite image for display.

15. An image processing apparatus comprising:

noise detection means for performing detection of position and intensity of noise, to an input image;

noise removal means for removing noise from the input image, on the basis of the position and intensity of noise detected by the noise detection means;

image generation means for generating an image indicating pixels included in an area of the input image targeted for noise removal, using a predetermined color according to the intensity of noise, on the basis of the position and intensity of noise detected by the noise detection means; and image composition means for superimposing the image generated by the image generation means on the image before being subjected to noise removal by the noise removal means or on the image from which noise has been removed, to generate a composite image for display.

16. An image processing apparatus as defined in claim 15, wherein the intensity of the noise detected by the noise detection means is only one, and the color of the image generated by the image generation means is only one.

17. An image processing apparatus comprising:

noise detection means for performing noise detection to an input image;

noise removal means for removing noise from the input image on the basis of the result of the noise detection; and image composition means for receiving the input image and the output image from the noise removal means, and spatially combining a part of the input image with a part of the output image from the noise removal means so as to display the same on the screen, to generate a composite image to be output, wherein the image composition means cuts partial images of the same region from the input image and the output image from the noise removal means, respectively, and generates an image in which the partial images are arranged vertically or horizontally.

18. An image processing apparatus as defined in claim 11 further comprising:

image decoding means for decoding an image code sequence to generate a decoded image;

said noise detection means receiving the image code sequence, and performing noise detection using information included in the image code sequence; and said noise removal means removing noise from the decoded image outputted from the image decoding means, on the basis of the result of the noise detection.

19. An image processing apparatus as defined in claim 11, wherein the noise is one of blocking artifact and ringing artifact.

20. An image processing apparatus as defined in claim 11, wherein the predetermined region to be subjected to noise removal by the noise removal means is an assembly of pixels in the vicinity of a boundary of each block.

21. An image processing method as defined in claim 2 further comprising:
   decoding an image code sequence to generate a decoded image;
   performing noise detection using information included in the image code sequence; and
   removing noise from the decoded image obtained in said decoding, on the basis of the result of the noise detection.

22. An image processing method as defined in claim 3 further comprising:
   decoding an image code sequence to generate a decoded image;
   performing noise detection using information included in the image code sequence; and
   removing noise from the decoded image obtained in said decoding, on the basis of the result of the noise detection.

23. An image processing method as defined in claim 4 further comprising:
   decoding an image code sequence to generate a decoded image;
   performing noise detection using information included in the image code sequence; and
   removing noise from the decoded image obtained in said decoding, on the basis of the result of the noise detection.

24. An image processing method as defined in claim 5 further comprising:
   decoding an image code sequence to generate a decoded image;
   performing noise detection using information included in the image code sequence; and
   removing noise from the decoded image obtained in said decoding, on the basis of the result of the noise detection.

25. An image processing method as defined in claim 2, wherein the noise is one of blocking artifact and ringing artifact.

26. An image processing method as defined in claim 3, wherein the noise is one of blocking artifact and ringing artifact.

27. An image processing method as defined in claim 4, wherein the noise is one of blocking artifact and ringing artifact.

28. An image processing method as defined in claim 5, wherein the noise is one of blocking artifact and ringing artifact.

29. An image processing method as defined in claim 2, wherein the predetermined region to be subjected to noise removal in said removing noise is an assembly of pixels in the vicinity of a boundary of each block.

30. An image processing method as defined in claim 3, wherein the predetermined region to be subjected to noise removal in said removing noise is an assembly of pixels in the vicinity of a boundary of each block.

31. An image processing method as defined in claim 4, wherein the predetermined region to be subjected to noise removal in said removing noise is an assembly of pixels in the vicinity of a boundary of each block.

32. An image processing method as defined in claim 5, wherein the predetermined region to be subjected to noise removal in said removing noise is an assembly of pixels in the vicinity of a boundary of each block.

33. An image processing apparatus as defined in claim 12 further comprising:
   image decoding means for decoding an image code sequence to generate a decoded image;
   said noise detection means receiving the image code sequence, and performing noise detection using information included in the image code sequence; and
   said noise removal means removing noise from the decoded image outputted from the image decoding means, on the basis of the result of the noise detection.

34. An image processing apparatus as defined in claim 13 further comprising:
   image decoding means for decoding an image code sequence to generate a decoded image;
   said noise detection means receiving the image code sequence, and performing noise detection using information included in the image code sequence; and
   said noise removal means removing noise from the decoded image outputted from the image decoding means, on the basis of the result of the noise detection.

35. An image processing apparatus as defined in claim 14 further comprising:
   image decoding means for decoding an image code sequence to generate a decoded image;
   said noise detection means receiving the image code sequence, and performing noise detection using information included in the image code sequence; and
   said noise removal means removing noise from the decoded image outputted from the image decoding means, on the basis of the result of the noise detection.

36. An image processing apparatus as defined in claim 15 further comprising:
   image decoding means for decoding an image code sequence to generate a decoded image;
   said noise detection means receiving the image code sequence, and performing noise detection using information included in the image code sequence; and
   said noise removal means removing noise from the decoded image outputted from the image decoding means, on the basis of the result of the noise detection.

37. An image processing apparatus as defined in claim 12, wherein the noise is one of blocking artifact and ringing artifact.

38. An image processing apparatus as defined in claim 13, wherein the noise is one of blocking artifact and ringing artifact.

39. An image processing apparatus as defined in claim 14, wherein the noise is one of blocking artifact and ringing artifact.

40. An image processing apparatus as defined in claim 15, wherein the noise is one of blocking artifact and ringing artifact.

41. An image processing apparatus as defined in claim 12, wherein the predetermined region to be subjected to noise removal by the noise removal means is an assembly of pixels in the vicinity of a boundary of each block.

42. An image processing apparatus as defined in claim 13, wherein the predetermined region to be subjected to noise removal by the noise removal means is an assembly of pixels in the vicinity of a boundary of each block.

43. An image processing apparatus as defined in claim 14, wherein the predetermined region to be subjected to noise removal by the noise removal means is an assembly of pixels in the vicinity of a boundary of each block.

44. An image processing apparatus as defined in claim 15, wherein the predetermined region to be subjected to noise removal by the noise removal means is an assembly of pixels in the vicinity of a boundary of each block.

* * * * *